United States Patent [19]
Henning et al.

[11] Patent Number: 5,595,840
[45] Date of Patent: Jan. 21, 1997

[54] METHOD OF MANUFACTURING MODULAR MOLDED COMPONENTS FOR A BIPOLAR BATTERY AND THE RESULTING BIPOLAR BATTERY

[75] Inventors: Jeffrey M. Henning, Eagan; David L. Lund, Minneapolis, both of Minn.

[73] Assignee: GNB Technologies, Inc., Mendota Heights, Minn.

[21] Appl. No.: 563,193

[22] Filed: Nov. 27, 1995

[51] Int. Cl.[6] .................................................. H01M 4/72
[52] U.S. Cl. ...................... 429/210; 429/212; 429/233; 429/247; 29/2; 29/402.11; 29/623.1; 29/402.09
[58] Field of Search ........................... 29/17.1, 2, 623.1, 29/402.9, 402.11; 264/320, 325; 429/247, 233, 210, 212

[56] References Cited

U.S. PATENT DOCUMENTS

| | | | |
|---|---|---|---|
| 3,733,159 | 5/1973 | Coffman | 264/325 X |
| 4,658,499 | 4/1987 | Rowlette | 29/623.1 |
| 5,035,045 | 7/1991 | Bowen et al. | 29/623.2 |
| 5,260,017 | 11/1993 | Giles, Jr. | 264/322 |
| 5,348,817 | 9/1994 | Rao et al. | 429/210 |
| 5,429,643 | 7/1995 | Lund et al. | 29/623.3 |
| 5,447,668 | 9/1995 | Delanpis | 264/101 |

Primary Examiner—M. Nuzzolillo
Attorney, Agent, or Firm—Leydig, Voit & Mayer, Ltd.

[57] ABSTRACT

A method for making a molded plastic component for a bipolar battery, such as a lead-acid battery, comprises molding a plastic frame about a thin electrically conductive substrate, embedding the periphery of the substrate in the plastic frame and then removing the warpage resulting from the molding by a suitable surface reformation step, as by die stamping, to restore a surface that will allow desirable electrical performance to be achieved when the bipolar battery is used in service.

14 Claims, 3 Drawing Sheets

METHOD OF MANUFACTURING MODULAR MOLDED COMPONENTS FOR A BIPOLAR BATTERY AND THE RESULTING BIPOLAR BATTERY

FIELD OF THE INVENTION

This invention relates to batteries such as, for example, bipolar batteries utilizing modular molded components comprising an electrically conductive substrate molded into a plastic frame and to the resulting battery.

DESCRIPTION OF THE PRIOR ART

Lead-acid batteries and cells have been known for a substantially long period of time and have been employed commercially in a relatively wide variety of applications. Such applications have ranged from starting, lighting and ignition for automobiles, trucks and other vehicles (often termed "SLI batteries") to marine and golf cart applications and to various stationary and motive power source applications (sometimes termed "industrial battery" applications).

The lead-acid electrochemical system has provided a reliable energy source which is capable of being manufactured in automated production while providing acceptable quality. However, one serious drawback of either the flooded or sealed, absorbed electrolyte, lead-acid batteries is the relatively low energy and power density (i.e., kilowatts/unit weight and watt-hours/unit weight, respectively) provided by such systems. It has long been a desire to provide an energy source with the reliability of a flooded or sealed lead-acid battery system while at the same time achieving a much greater energy and power density.

For this reason, considerable effort over at least the last 20 years has been directed to using lead-acid and other electrochemical systems in a bipolar design. In such a design, by definition, the positive and negative plates in some fashion share the same conductive grid or substrate. Some of the patents relating to bipolar batteries or to components and the like for such batteries include the following United States patents: U. S. Pat. No. 2,416,576 to Franz et al; U. S. Pat. No. 2,496,709 to Jelardin; U. S. Pat. No. 2,966,538 to Bernot; U. S. Pat. No. 3,728,158 to Poe et al.; U. S. Pat. No. 3,775,189 to Jaggard; U. S. Pat. No. 3,910,731 to Warszawski et al.; U. S. Pat. No. 3,941,615 to McDowall; U. S. Pat. No. 4,125,680 to Shropshire et al.; U.S. Pat. No. 4,964,878 to Morris; and U. S. Pat. No. 5,068,160 to Clough et al.

Some of these patents utilize metallic substrates which are molded into a plastic frame of varying configurations. However, there are a variety of technical problems that need to be addressed and solved when utilizing this approach. Indeed, some of the diverse problems precipitated alternative approaches which did not utilize metallic substrates. U.S. Pat. No. 4,658,499 to Rowlette is not only directed to such an alternative approach, but sets forth, as background, various other alternative approaches which have been suggested.

Thus, despite the substantial advantages that could be achieved using bipolar batteries and cells and the substantial amount of work and attention directed to this type of battery over at least the last 20 years, it would appear that bipolar batteries, such as bipolar lead-acid batteries, have remained a very promising but elusive curiosity, largely remaining as a laboratory curiosity. Thus, the need existed for a well-designed bipolar battery that would achieve the enhanced energy and power densities that only a bipolar battery can provide while satisfactorily dealing with the diverse problems in assembling and design identified by the prior art. More particularly, there existed a substantial need for a bipolar battery design composed of components that could be assembled in a automated, reliable fashion, while achieving a well-functioning battery in a cost-effective manner. U.S. Pat. No. 5,429,643 to Lund et al., assigned to the assignee of the present invention, does provide a method for assembling a bipolar lead-acid battery which is amenable to automated production at commercially acceptable production rates, utilizing modular bipolar battery components which include a series of molded plastic frames with metallic inserts.

Nevertheless, and while the plastic molding operations involved are, in general, relatively straightforward, the extreme differences in thermal expansion and contraction characteristics between the conductive substrate and the plastic material used for the frame create problems in controlling the molding operation. This situation is exacerbated by the fact that the conductive substrate used as the bipolar plate is necessarily relatively thin, and is susceptible to buckling, warpage, and the like, both during molding and in subsequent handling and processing steps. There accordingly exists a need to provide modular plastic components, that are characterized by enhanced freedom from such warpage, buckling and the like so as to provide a bipolar battery having more consistent electrical performance due to improved uniformity of plate separation and of active material paste thicknesses. Stated differently, it is important to maintain the uniformity of compression contact of the separator adjacent to the active material paste to achieve optimum electrical performance. In effect, inconsistent separator compression creates uneven access of the active material to the ions in the electrolyte, thereby impairing the electrical performance of the battery.

It is accordingly a principal object of the present invention to provide a modular plastic frame having an embedded conductive substrate capable of providing a battery having improved uniformity of paste thickness. A related object provides a bipolar battery assembled from such modular plastic components characterized by improved performance characteristics.

A further object of this invention provides an easily automated, cost-effective method for forming such modular plastic components.

A still further object lies in the provision of modular components having lessened susceptibility to buckling during handling and processing.

These and other objects and advantages of the present invention will be apparent from the following description and drawings.

SUMMARY OF THE INVENTION

In molding a modular component for a bipolar battery having a thin, flexible conductive substrate embedded in a plastic frame, the molding operation typically results in significant warpage, presumably due to differences in the thermal expansion and contraction characteristics of the plastic used for the substrate and of the conductive substrate itself. In general, the present invention is predicated upon the discovery that a post-molding surface reformation step can be utilized to remove the warpage and provide a relatively flat surface which will result in a relatively uniform thickness of the active material, as well as providing enhanced uniformity of plate separation in the assembled battery, thereby enhancing the overall electrical performance. In this fashion, the molding operation is facilitated inasmuch as the issue of warpage and the like can be largely ignored during molding. The resulting molded plastic component is then subjected to surface reformation which has been found to not only effectively remove the warpage, but which also stiffens, and thus strengthens, the thin-flexible substrate so as to lessen problems such as buckling resulting from subsequent handling and processing.

DETAILED DESCRIPTION OF THE INVENTION

Figure 1:
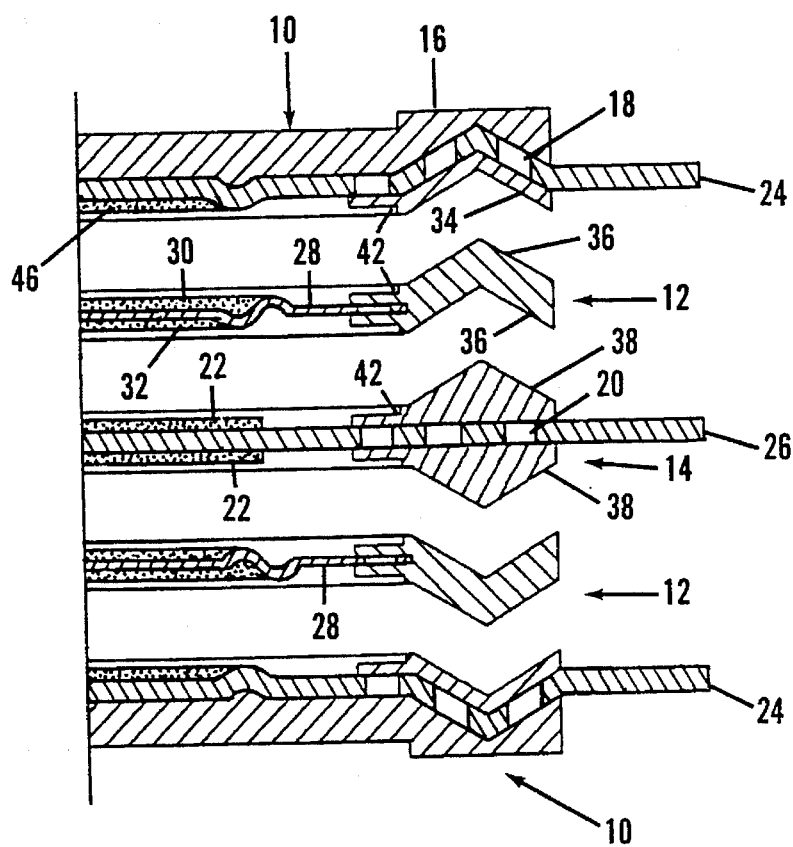
FIG. 1 is a partial cross-sectional view of one embodiment of the electrical components which may be utilized in making a bipolar battery, according to the present invention and which is exploded away to illustrate the respective components.
Figure 2:
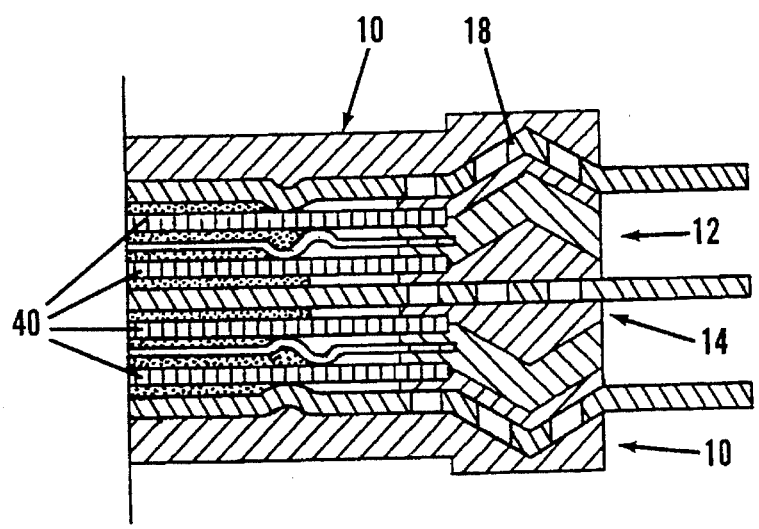
FIG. 2 is a partial cross-sectional view similar to FIG. 1, except illustrating the various components compressed together with separators positioned between the respective components as would occur during assembly.

To make the bipolar battery of the present invention, the requisite molded plastic, modular, electrochemical components configured to provide the desired voltage and capacity characteristics are first assembled. In the illustrative embodiment, as shown in FIGS. 1 and 2, the modular electrochemical components, comprising end frames 10, active frames 12, and center frame 14, are configured to provide two 4-volt batteries in parallel, achieved by using the unique bipolar configuration described in U.S. Pat. No. 5,348,817 to Rao et al.

More particularly, the end frames 10 comprise a thermoplastic peripheral frame 16 having a conductive member 18 embedded therein. Any conductive member 18 suitable for the particular electrochemical system of the bipolar battery involved may be used. As one illustrative embodiment, for use with a lead-acid bipolar battery, the conductive member 18 can comprise a sheet of lead or a lead alloy, or lead-clad or lead alloy-clad copper. Materials of this type are available. The copper sheet provides some rigidity, low resistance and current carrying ability, and such a copper sheet can desirably function as the terminals for the battery. The lead alloy sheet functions to provide resistance to corrosion from the sulfuric acid electrolyte employed. In other instances, it may be useful to utilize lead or lead alloys such as are used in conventional flooded or sealed lead-acid batteries. In any event, the metallic substrate or conductive member 18 is relatively thin and flexible. As one illustrative example, the thickness of the conductive or metallic substrate can be 0.008 inch and, more typically may range from 0.010 to 0.030 inch. As may be appreciated, such a thin substrate is indeed subject to buckling during molding and upon handling subsequent to molding. However, to provide the desired electrochemical performance characteristics, this is illustrative of the thicknesses which find utility for many applications.

In the illustrative embodiments in FIGS. 1 and 2, the end frames 10 are unipolar, and both end frames may be pasted to be either positive or negative as is desired. In embodiment illustrated in FIGS. 1 and 2, both end frames 10 have a layer of positive paste adhered to conductive member 18.

Center frame 14 may be made similar to the end frames 10. Thus, center frame 36 may be molded from a thermoplastic material and may utilize a conductive member 20 such as, for example, lead or any lead alloy used in lead-acid batteries, or lead or lead alloy-clad copper or the like. The lead alloy-clad faces of center frame 14 may then be coated with conventional lead-acid battery paste. Pursuant to the Rao et al. '817 patent, previously referenced, both faces of the center frame 14 are pasted to be either positive or negative. Whether the center frame is pasted to be positive or negative will depend upon the terminal arrangement desired. When the center frame 14 is pasted to be a central bi-negative plate to provide a negative central terminal (as shown in FIGS. 1 and 2), the end frames 10 will be pasted to be positive plates, and vice-versa when a central bi-positive plate is used. Thus, in the illustrative embodiment of FIGS. 1 and 2, center frame 14 is pasted with a layer 22 of negative active paste on each face. End frames 10 thus provide the positive terminals 24. Center frame 14 provides the negative terminal 26.

Bipolar active frames 12 may be molded from a thermoplastic material and have embedded therein a conductive member 28. As one illustrative example of a suitable conductive member, a lead alloy sheet, as thin as foil, may be utilized. Both faces of the lead alloy sheet are coated with conventional lead-acid battery paste, one face being coated with a negative paste layer 30, and the other with a positive paste layer 32.

The entire sheet of conductive member 28 of active frames 12 serves the same purpose as an intercell connector in a conventional lead-acid battery. The high ratio of the intercell connection area to the pasted area and the very short intercell current path gives the bipolar battery design tremendous performance advantages in comparison to conventional lead-acid battery designs.

To form a recombinant or valve-regulated bipolar battery, highly absorbent glass separators made from microfine fibers are utilized. Such glass fiber separators are known and may be used, as may absorbent separators made from the microfine synthetic fibers only or made from a combination of synthetic and glass fibers. The thickness should be such so as to provide the battery with adequate absorptivity so that sufficient electrolyte will be retained to provide the desired capacity.

As is known, to provide the desired compression and spacing, it is necessary to compress the separator by about 15 to 30 percent of the uncompressed thickness. To this end, the end portion 34, 36, and 38 of an end, active and center frame 10, 12, and 14, respectively, are configured to provide the desired compression when compressed together, as is shown in FIG. 2. Separators 40 are thus compressed between respective frame members. Suitably, each of the respective frame members 10, 12, and 14 include shoulders 42 to hold the separators 40 in position.

The appropriate stacking of the electrochemical components can be seen from FIGS. 1 and 2. Each bipolar active frame 12 is positioned such that the negative paste layer 30 faces the positive paste layer 44 of end frame 10. Correspondingly, the positive face layer 32 of each bipolar active frame 12 faces a negative paste layer 22 of central frame 14. When additional voltage and capacity are desired, additional active frames 12 are employed, positioned in the frame stack as described herein. The preferred method of assembly of the respective frame members into a battery is disclosed in the previously referenced '743 Lund et al. patent, the disclosure of which is herein incorporated by reference.

The molding techniques used to manufacture such modular components as the various frames hereinbefore described are well known and may be employed as is desired. In general, such plastic modular components are molded by straightforward injection molding techniques. The substrate is inserted into position in a mold having the desired configuration, the mold is closed, and then the plastic is injected to embed the substrate about its periphery into the plastic frame.

The configuration for the frame member can be varied as desired. In general, the substrate should be adequately embedded in the frame about its periphery and the frame member should have adequate surface area to allow necessary further processing and assembly, such as is, for example, illustrated and described in the aforementioned Lund et al. '643 patent. Any type of a plastic having the characteristics desired for the particular application which may be molded, as by injection molding and the like, may be employed. More typically, for lead-acid bipolar batteries, it will be generally satisfactory to use polypropylene and ethylene-propylene copolymers. Materials of this type are conventionally used for lead-acid battery containers.

As has been previously discussed herein, the typical result of the molding of these modular components is that the relatively thin, flexible electrically conductive substrate is warped, presenting an overall uneven surface which can drastically impair both the uniformity of the thickness of the active material paste as well as the uniformity of the plate separation upon assembly of the bipolar battery. This can result in undesirable performance characteristics of the bipolar battery which may be quite significant.

Pursuant to the present invention, the resulting molded component having warpage (i.e., an uneven surface causing the problems previously referenced) is subjected to a surface reformation step. To this end, this surface reformation of the modular component can readily eliminate the warpage, providing essentially a uniform surface other than in the region of the surface reformation itself. In this fashion, the molding operation itself is facilitated because attention does not have to be directed to critically controlling the molding parameters in an attempt to minimize warpage. Rather, the operation can be carried out expeditiously, and then the surface reformation, in effect, can erase or eliminate the warpage. It has thus been found that the small area where surface reformation is required to achieve an essentially even surface is so small in relation to the total area of the conductive substrate that the effect on the performance of the battery caused by the surface reformation is minimal. Also, it has been found that the surface reformed modular component actually functions to stiffen the thin, flexible substrate so as to facilitate subsequent handling and processing and to lessen the probability that the substrate will undesirably buckle.

The percent area that is reformed relative to the main portion of the substrate can vary, as an example, from about 0.1 to about 4 percent, more typically 1–2 percent, of the total surface area of the substrate that is available to receive active material paste. However, as may be appreciated, molding techniques and operations can vary and the plastic used will likewise affect the degree of warpage that results. Accordingly, the degree of reformation required in a specific case can be determined in a straightforward fashion, i.e., simply by testing.

Figure 3:
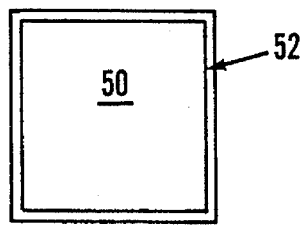
FIG. 3 is a schematic view of a molded plastic, modular component having a surface reformation according to the present invention in a picture frame configuration.
Figure 4:
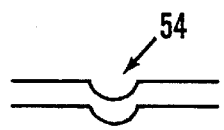
FIG. 4 is a schematic and partial cross-section of the modular component shown in FIG. 3, illustrating the cross-section after carrying out the surface reformation step.

FIGS. 3 and 4 show one embodiment of the modular plastic frame according to the present invention. In this embodiment, the substrate 50 has a picture frame surface reformation extending about the periphery of substrate 50, as is shown at 52. As shown in FIG. 4, the cross-sectional shape of the surface reformation is configured as, in general, a semicircle, as indicated at 54. One advantage of this embodiment is that the surface reformation area is positioned about the periphery, leaving the vast majority of the surface area to accept an active material paste which can be of uniform thickness and which will result in uniform plate separation upon assembly.

Figure 5:
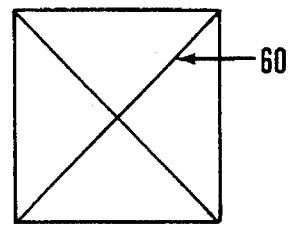
FIG. 5 is a schematic view of another embodiment of a modular component having an X-rib surface reformation configuration.
Figure 6:
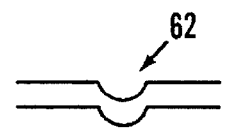
FIG. 6 is a partial cross-section of the embodiment shown in FIG. 5 and illustrating the cross-sectional shape resulting from the surface reformation.

FIGS. 5 and 6 illustrate a further embodiment of the present invention. In this embodiment, as is shown in FIG. 5, the surface reformation is in the configuration of an X-rib, as is shown at 60. As in the prior embodiment, and as is shown in FIG. 6, the cross-section of the X-rib surface reformation area is illustrated in the configuration essentially of a semicircle, as indicated at 62. It has been found that the more extensive warpage can occur in the central area of the substrate; and, accordingly, an important advantage of the embodiment of FIGS. 5 and 6 is that the surface reformation configuration can more readily and adequately remove the surface warpage in this central area.

Figure 7:
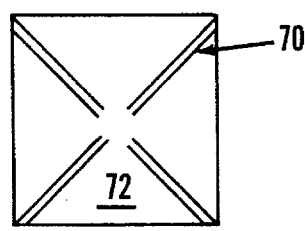
FIG. 7 is a schematic view of yet another embodiment of the modular component of the present invention having a double X-rib surface reformation, or S-rib configuration.
Figure 8:
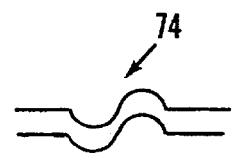
FIG. 8 is a partial cross-section of the modular component shown in FIG. 7 and illustrating the shape following the surface deformation.

FIGS. 7 and 8 show yet another embodiment of the molded modular component of the present invention. In this embodiment, an X-rib surface reformation configuration 70 is provided on both sides of the substrate 72. As seen in FIG. 8, the over all cross-section of the surface reformation is an S-rib configuration as shown at 74. An embodiment such as this embodiment may be employed where warpage is more extensive.

Figure 9:
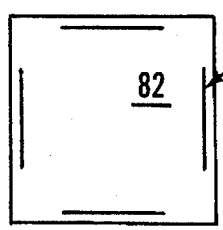
FIG. 9 is a schematic view of a still further embodiment of the present invention and showing a partial picture frame configuration.
Figure 10:
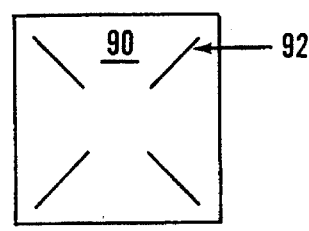
FIG. 10 is a schematic view of another embodiment of the present invention and illustrating a partial X-rib configuration.

FIG. 9 shows another embodiment of this invention similar to the picture frame configuration shown in FIGS. 3 and 4, except that the surface reformation 80 of the substrate 82 is a partial configuration. Similarly, FIG. 10 shows a still further embodiment in which the substrate 90 includes a partial X-rib configuration 92.

It should also be appreciated that the surface configurations employed can be combined, if desired. For example, the S-rib configuration shown in FIGS. 7 and 8 can be utilized with any of the other surface reformation configurations.

Thus, the overall configuration of the surface reformation can be varied as desired, consistent with the requirements resulting from a particular molding operation. What is considered important is that the extent of surface reformation should be adequate to eliminate, or essentially eliminate, the warpage resulting from the molding operation. In addition, what has been termed the semicircle configuration of the surface reformation relative to the remainder of the conductive or metallic substrate can be varied as is considered desirable.

As may be appreciated, the timing of the surface reformation step relative to the completion of the molding operation is important. Of course, it will be generally desirable to allow the molded modular component to cool to generally ambient conditions before initiating the surface reformation step. Further, as may be appreciated, the warpage may increase in the hours after completion of the molding operation.

Most typically, the vast majority of warpage which will occur will take place within the first 24 hours or so from the completion of the molding operation. It is entirely satisfactory to carry out the surface reformation at any time after adequate cooling from the molding operation has taken place; but, in this event, the extent and type of surface reformation should be effected so as to take into account, and compensate for, additional warpage which will occur upon further aging (viz., the time from completion of the molding operation). As a practical matter, it will perhaps be more straightforward simply to allow the molded components to age until the substantial portion of the warpage that will occur has in fact occurred. The requisite aging time can be determined in a straightforward fashion, and it has been found satisfactory to provide an aging time of about 24 hours or so.

The surface reformation step itself can be carried out by any means desired. Many suitable techniques are known and can be used. One example is a conventional die stamping operation.

Figure 11:
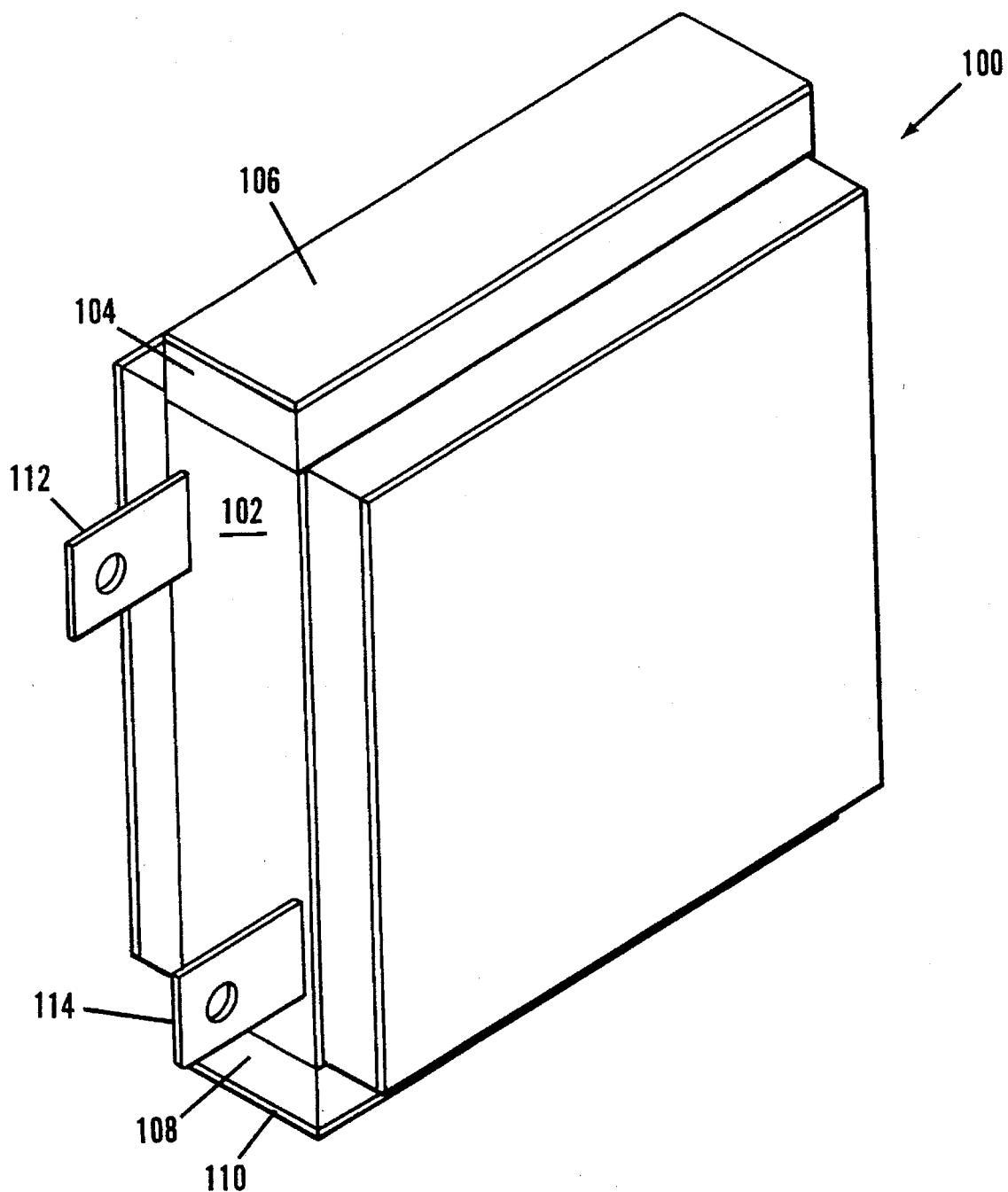
FIG. 11 is a perspective view of a bipolar battery which can utilize the modular plastic components of the present invention.

FIG. 11 illustrates a suitable bipolar battery made using the molded modular components of the present invention. The bipolar battery 100 thus comprises side panels 102, fill/vent box 104, fill/vent box cover 106, vacuum box 108, vacuum box cover 110, positive terminal 112 and negative terminals 114 which may be electrically connected by using electrical jumpers/bus bars installed as necessary to provide the electrical connections desired. The further assembly and configuration of the battery is described in the Lund et al. '643 patent herein identified, the disclosure of which is herein incorporated by reference.

Thus, as has been seen, the present invention provides a facile method for providing modular plastic components for a bipolar battery which can remove the undesirable warpage which occurs in molding so as to allow for uniform plate separation in the assembled battery as well as allowing the paste to be applied in essentially a uniform manner. It has been found that the surface reformation involved in the present invention overcomes the warpage problem and allows a bipolar battery to be provided which has the desirable electrical performance characteristics achieved with consistent active material separation and separator compression.

While the present invention has been illustrated and described herein with respect to certain preferred embodiments, it should be appreciated that the present invention is not so limited. Thus, for example, while the present invention has been described principally in conjunction with a bipolar lead-acid battery, it should be appreciated that the present invention is likewise applicable to any type of a bipolar battery which can utilize a molded modular component comprising a conductive substrate embedded in a plastic frame member and which is subject to the warpage problem described herein. Of course, the active material paste and other aspects of the battery design will vary with the particular electrochemistry involved.

We claim:

1. A method for making a modular molded plastic component for a bipolar battery, said component comprising an electrically conductive substrate having its periphery embedded in a molded plastic frame and the remainder of the surface exposed to accept an active material paste which method comprises providing a molded plastic component wherein the substrate has warpage and thereafter subjecting the substrate surface available to accept an active material paste to surface reformation in a configuration to eliminate the warpage in other than the area of the surface reformation.

2. The method of claim 1, wherein the bipolar battery is a lead-acid bipolar battery and the conductive substrate is lead, a lead alloy, or a lead or lead alloy-clad metal.

3. The method of claim 2, wherein the conductive substrate has a thickness of from about 0.008 to 0.03 inches.

4. The method of claim 2, wherein the surface reformation is carried out by die stamping.

5. The method of claim 2, wherein the area of the surface reformation is from about 0.1 to about 4% of the total area of the conductive substrate exposed to accept an active material paste.

6. The method of claim 2, wherein the surface reformation is in the configuration of at least a partial picture frame adjacent the molded plastic frame.

7. The method of claim 2, wherein the surface reformation is in the configuration of at least a partial X-rib extending across the surface of said substrate.

8. The method of claim 2, wherein the surface reformation is in the configuration of an S-rib as viewed in cross-section of the conductive substrate.

9. A modular, molded plastic component for a bipolar battery which comprises an electrically conductive substrate having a periphery and at least one surface to accept an active material paste and a plastic frame molded about, and embedding within, the periphery of the conductive substrate, said substrate having warpage upon molding and said paste surface having surface reformation in a configuration eliminating such warpage in other than the area of the surface reformation.

10. The plastic component of claim 9, wherein said bipolar battery is a lead-acid bipolar battery.

11. A bipolar battery including a plurality of molded plastic components, each of said components comprising an electrically conductive substrate having a periphery and at least paste surface to accept an active material paste, a plastic frame molded about, and embedding within, the periphery of the conductive substrate, said substrate having warpage upon molding and said paste surface having surface reformation in a configuration eliminating such warpage in other than the area of the surface reformation.

12. The bipolar battery of claim 11, wherein the bipolar battery is lead-acid.

13. The plastic component of claim 9 wherein the conductive substrate has a thickness of from about 0.008 to 0.03 inches.

14. The bipolar battery of claim 11, wherein the conductive substrate has a thickness of from about 0.008 to 0.03 inches.

* * * * *